United States Patent
Smart et al.

(10) Patent No.: US 6,735,255 B1
(45) Date of Patent: May 11, 2004

(54) CORRELATION BASED METHOD OF DETERMINING FRAME BOUNDARIES OF DATA FRAMES THAT ARE PERIODICALLY EXTENDED

(75) Inventors: Kevin J. Smart, Bountiful, UT (US); Scott A. Bevan, Lehi, UT (US); William Kurt Dobson, Sandy, UT (US); Trent Stoddard, Sandy, UT (US); Mark W. Christiansen, Highland, UT (US)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 09/515,800

(22) Filed: Feb. 29, 2000

Related U.S. Application Data

(63) Continuation-in-part of application No. 09/321,993, filed on May 28, 1999, and a continuation-in-part of application No. 09/321,992, filed on May 28, 1999.

(51) Int. Cl.[7] .............................................. H04L 27/28
(52) U.S. Cl. ........................ 375/260; 375/343; 375/360; 370/506; 370/510
(58) Field of Search ................................ 375/130, 260, 375/316, 324, 326, 340, 342, 343, 354, 355, 357, 360, 362, 371; 370/203, 210, 320, 335, 342, 441, 479, 503, 506, 510, 515, 516; 708/422, 813; 455/59

(56) References Cited

U.S. PATENT DOCUMENTS

| | | | |
|---|---|---|---|
| 5,444,697 A | * | 8/1995 | Leung et al. ............... 370/207 |
| 5,652,772 A | * | 7/1997 | Isaksson et al. ............ 375/367 |
| 5,914,933 A | * | 6/1999 | Cimini et al. ............... 370/208 |
| 6,134,283 A | * | 10/2000 | Sands et al. ................ 375/354 |

FOREIGN PATENT DOCUMENTS

| | | |
|---|---|---|
| EP | 608 024 A1 | 7/1994 |
| EP | 653 858 A2 | 5/1995 |
| EP | 730 357 A2 | 9/1996 |
| EP | 903 897 | 3/1999 |
| EP | 955 754 | 11/1999 |
| WO | WO 97/26742 | 1/1997 |
| WO | WO 98/10549 | 3/1998 |
| WO | WO 99/44326 | 9/1999 |

OTHER PUBLICATIONS

U.S. patent application Ser. No. 09/321,992 (Kevin J. Smart et al.), filed Mar. 29, 1999.

U.S. patent application Ser. No. 09/321,993 (Kevin J. Smart et al.), filed Mar. 29, 1999.

\* cited by examiner

*Primary Examiner*—Stephen Chin
*Assistant Examiner*—Dac V. Ha
(74) *Attorney, Agent, or Firm*—McDonnell Boehnen Hulbert & Berghoff LLP

(57) ABSTRACT

A correlator for use in a timing recovery apparatus of a receiver in a multicarrier transmission system. The correlator locates the beginning of a data frame and initializes a pointer register with an address to a location within the receive signal buffer. Data is transferred to a signal converter from the receive signal buffer where the samples that are fed into the converter are determined by the address stored in the pointer register.

13 Claims, 10 Drawing Sheets

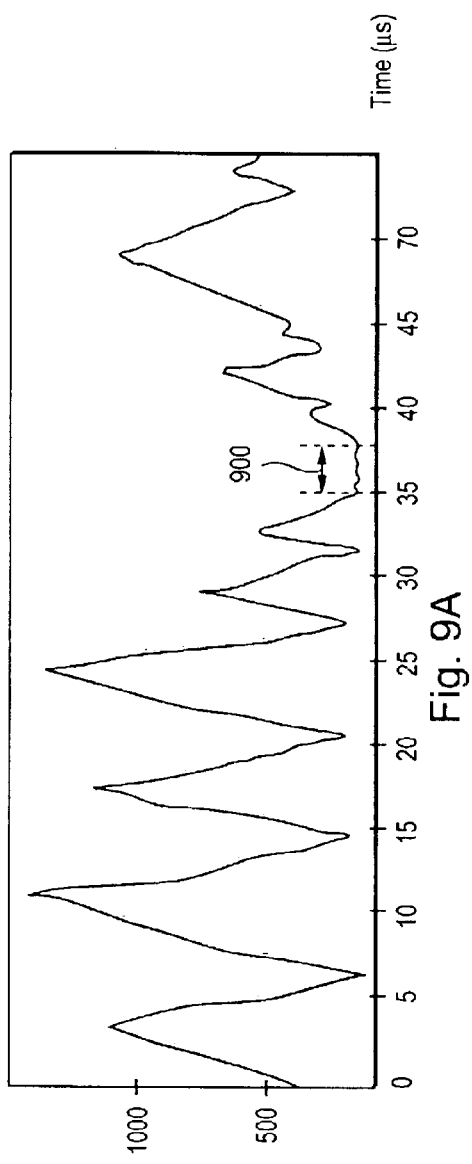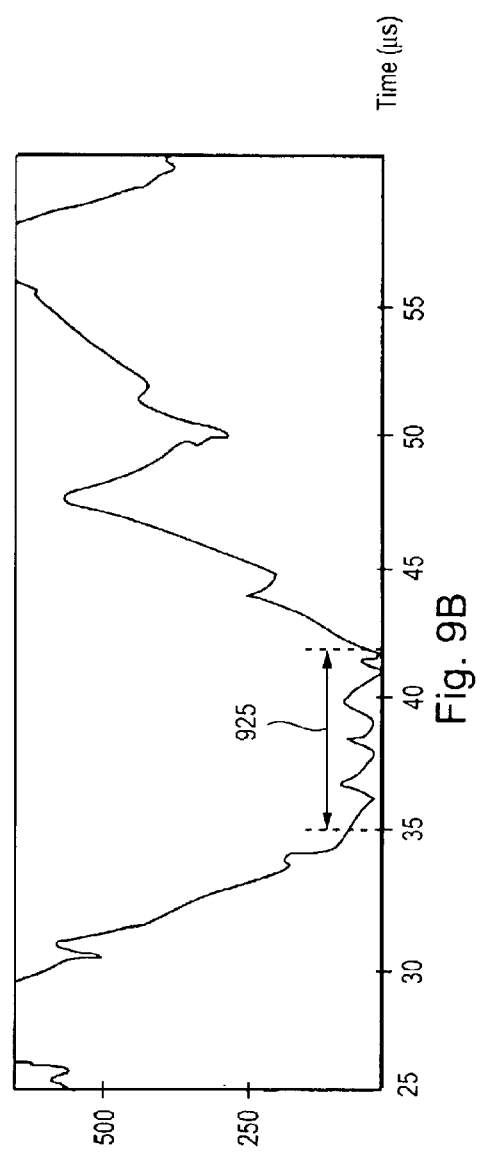

ically Extended

REFERENCE TO RELATED APPLICATIONS

This application is a continuation-in-part application of the U.S. application Ser. No. 09/321,993, filed on May 28, 1999, and Ser. No. 09/321,992, filed on May 28, 1999, and therefore claims priority benefits under 35 U.S.C. § 120. This application further incorporates by reference the U.S. application Ser. No. 09/321,993, filed on May 28, 1999, and Ser. No. 09/321,992, filed on May 28, 1999 in their entirety.

BACKGROUND OF THE INVENTION

A. Field of the Invention

The present invention relates to a method and device for recovering timing information in a multi-carrier communication system. Specifically the invention relates to a method and structure for correcting for the effects of a frequency offset between a transmitter clock and a receiver clock in a multi-carrier transmission system, as found, for example, in ADSL transceivers.

B. Description of the Related Art

1. Asymmetric Digital Subscriber Lines

Asymmetric Digital Subscriber Line (ADSL) is a communication system that operates over existing twisted-pair telephone lines between a central office and a residential or business location. It is generally a point-to-point connection between two dedicated devices, as opposed to multi-point, where numerous devices share the same physical medium.

ADSL supports bit transmission rates of up to approximately 6 Mbps in the downstream direction (to a subscriber device at the home), but only 640 Kbps in the upstream direction (to the service provider/central office). ADSL connections actually have three separate information channels: two data channels and a POTS channel. The first data channel is a high-speed downstream channel used to convey information to the subscriber. Its data rate is adaptable and ranges from 1.5 to 6.1 Mbps. The second data channel is a medium speed upstream channel providing bidirectional communication between the subscriber and the service provider/central office. Its rate is also adaptable and the rates range from 16 to 640 kbps. The third information channel is a POTS (Plain Old Telephone Service) channel. The POTS channel is typically not processed directly by the ADSL modems—the POTS channel operates in the standard POTS frequency range and is processed by standard POTS devices after being split from the ADSL signal.

The American National Standards Institute (ANSI) Standard T1.413, the contents of which are incorporated herein by reference, specifies an ADSL standard that is widely followed in the telecommunications industry. A similar standard, Recommendation G.992.1 from the ITU, is also incorporated herein by reference. A variation of the standard that accomodates POTS service without the use of a signal splitter is set forth in specification G.Lite, or Recommendation G.992.2, the contents of which are incorporated herein by reference. The ADSL standards specify a modulation technique known as Discrete Multi-Tone modulation.

2. Discrete Multi-tone Modulation

Discrete Multi-Tone (DMT) uses a large number of subcarriers spaced close together. Each subcarrier is modulated using a type of Quadrature Amplitude Modulation (QAM). Alternative types of modulation include Multiple Phase Shift Keying (MPSK), including BPSK and QPSK, and Differential Phase Shift Keying (DPSK). The data bits are mapped to a series of symbols in the I-Q complex plane, and each symbol is used to modulate the amplitude and phase of one of the multiple tones, or carriers. The symbols are used to specify the magnitude and phase of a subcarrier, where each subcarrier frequency corresponds to the center frequency of the "bin" associated with a Discrete Fourier Transform (DFT). The modulated time-domain signal corresponding to all of the subcarriers can then be generated in parallel by the use of well-known DFT algorithm called Inverse Fast Fourier Transforms (IFFT).

The symbol period is relatively long compared to single carrier systems because the bandwidth available to each carrier is restricted. However, a large number of symbols is transmitted simultaneously, one on each subcarrier. The number of discrete signal points that may be distinguished on a single carrier is a function of the noise level. Thus, the signal set, or constellation, of each subcarrier is determined based on the noise level within the relevant subcarrier frequency band.

Because the symbol time is relatively long and follows a guard band, intersymbol interference is a less severe problem than with single carrier, high symbol rate systems. Furthermore, because each carrier has a narrow bandwidth, the channel impulse response is relatively flat across each subcarrier frequency band. The DMT standard for ADSL, ANSI T1.413, specifies 256 subcarriers, each with a 4.3125 kHz bandwidth. Each sub-carrier can be independently modulated from zero to a maximum of 15 bits/sec/Hz. This allows up to 60 kbps per tone. DMT transmission allows modulation and coding techniques to be employed independently for each of the sub-channels.

The sub-channels overlap spectrally, but as a consequence of the orthogonality of the transform, if the distortion in the channel is mild relative to the bandwidth of a sub-channel, the data in each sub-channel can be demodulated with a small amount of interference from the other sub-channels. For high-speed wide-band applications, it is common to use a cyclic-prefix at the beginning, or a periodic extension at the end of each symbol, in order to maintain orthogonality, and more specifically, to eliminate inter-symbol-interference.

3. Frequency Domain Equalization

In standard DMT modulation, each N-sample encoded symbol is prefixed with a cyclic extension to allow signal recovery using the cyclic convolution property of the discrete Fourier transform (DFT). Of course, the extension may be appended to the end of the signal as well. If the length of the cyclic prefix, L, is greater than or equal to the length of the impulse response, the linear convolution of the transmitted signal with the channel becomes equivalent to circular convolution (disregarding the prefix). The frequency indexed DFT output sub-symbols are merely scaled in magnitude and rotated in phase from their respective encoded values by the circular convolution. It has been shown that if the channel impulse response is shorter than the length of the periodic extension, sub-channel isolation is achieved. Thus, the original symbols can then be recovered by transforming the received time domain signal to the frequency domain using the DFT (implemented using, e.g., the FFT), and performing equalization using a bank of single tap frequency domain equalizer (FEQ) filters. The FEQ effectively deconvolves (circularly) the signal from the transmission channel response. This normalizes the DFT coefficients allowing uniform QAM decoding.

Such an FEQ is shown in FIG. 1. The FFT calculator 20 accepts received time domain signals from line 10, and converts them to frequency domain representations of the symbols. Each frequency bin (or output) of the FFT 20 corresponds to the magnitude and phase of the carrier at the corresponding frequency. In FIG. 1, each bin therefore contains a separate symbol value X(i) for the $i^{th}$ carrier. The frequency domain equalizer FEQ 40 then operates on each of the FFT 20 outputs with a single-tap filter to generate the equalized symbol values X'(i). The FEQ 40 inverts the residual frequency response of the effective channel by a single complex multiplication. The FEQ outputs are then decoded by a slicer, or data decision device (not shown). The FEQ taps can be updated, and can make use of the slicer output in this regard. That is, the FEQ taps may be updated so as to minimize the error between the FEQ output and the slicer output. This is commonly referred to as decision feedback equalization, or decision-directed adaptation.

4. Timing Recovery

Also shown in FIG. 1 is a clock recovery and control circuit 30. The clock recovery circuit 30 analyzes the pilot tone that is embedded in the transmitted DMT signal in ADSL communication systems.

A typical hardware solution is shown in FIG. 2. The clock recovery components are indicated with dashed lines. Control words from a clock recovery algorithm running in a DSP 10 are converted to voltage levels by a digital-to-analog converter (DAC) 12 which controls the receive sampling rate of an ADC 14 through a voltage-controlled oscillator (VCO) 16. With a pure software timing recovery solution, the DAC 12 and VCO 16 (marked in dotted line) and any associated circuitry can be eliminated. A crystal at the nominal frequency would provide the ADC 14 sample clock.

Timing information may also be recovered using software techniques. One known method of implementing software clock recovery is to digitally resample the received signal at the transmitter's clock rate by interpolating the received samples. FIG. 3 is block diagram showing an input signal being applied to an interpolator 12, the output of which is applied to a clock recovery algorithm 22 executing on a microprocessor.

This is a general method and may be used to recover clock for any type of synchronous modulation but may differ in the way the transmit clock is extracted from the received signal. For DMT, one of the frequency bins output from a fast Fourier transform (FFT) function 30 is usually dedicated as a pilot tone. The clock recovery circuit 30, preferably an algorithm executing in a microprocessor, includes a filter to isolate the pilot tone and logic to estimate the clock offset between transmitter and receiver and to control the resampling rate in an interpolator.

The interpolation stage can be implemented a number of ways, but it generally consists of integrally interpolating receive samples to a rate (k) several times the nominal rate and then fractionally interpolating between two or more high rate samples using polynomial interpolation. Decimation to the final rate is accomplished by skipping over (not computing) samples and by computing only those samples needed to fractionally interpolate to the final rate. The interpolation rate (k) and the order of the polynomial used in the fractional interpolation can be traded off for a particular implementation in order to minimize complexity and provide tolerable interpolation error. Because this method can require tens of processor cycles for each interpolated sample it is not preferred for modems operating at high sample rates.

Because ADSL and other DMT modems are high-speed high bandwidth communication devices, they generally rely heavily on hardware solutions timing recovery solutions. As modem technologies mature, often the most important differentiator between one modem manufacture and the next is cost. One way to reduce cost is to reduce the hardware complexity of a modem. Cost savings can be significant for very high-speed modems with sample rates in the range of hundreds of kilohertz to several megahertz because of the premium placed on high-speed components. Of course, a software solution takes processor resources, which also has a cost, but processors tend to have steep development curves and newer versions are regularly introduced with increased capability and lower cost.

A software solution may also be important in applications where it is desirable (e.g., for reasons of cost, density or power dissipation) to separate the analog front-end (AFE) from the digital signal processor (DSP) running the modulation and demodulation tasks. Traditional methods of clock recovery require frequent adjustments to the sample clock of the analog-to-digital (ADC) converter located on the AFE. The rate and magnitude of these adjustments are generally controlled from a time-tracking algorithm in the DSP. A path must be provided between the DSP and AFE for clock control, and, in cases where providing a control path is difficult, a software clock recovery solution is an attractive option.

The invention has realized that it would be useful to provide a timing recovery solution for a multitone modem that can be implemented completely in software. The present invention provides a method for accomplishing this goal.

SUMMARY OF THE INVENTION

A correlator for use in a timing recovery apparatus of a receiver in a multicarrier transmission system is provided. The correlator locates the beginning of a data frame and initializes a pointer register with an address to a location within the receive signal buffer. Data is transferred to a signal converter from the receive signal buffer where the samples that are fed into the converter are determined by the address stored in the pointer register.

There are several methods of determining a symbol frame boundary in a multicarrier data signal. One such method includes the steps of forming a sample sequence from a received multicarrier signal, calculating a difference sequence from the sample sequence, forming a multiplicative estimate sequence from selected points within the difference sequence, forming a window sequence by summing selected points within the product sequence, locating the maximum value of the window sequence, and loading a pointer register based on the sequence index corresponding to the maximum value. The sample sequence is y[n], and the step of forming the difference sequence is performed in accordance with the relationship: $Z[n]=z_{max}-|y[n]-y[n+N]|$, where $z_{max}$ is the maximum value of $|y[n]-y[n+N]|$, and N is the number of samples in a symbol.

The step of forming a multiplicative estimate sequence, p[i,n], is performed in accordance with the relationship:

$$p[i, n] = \prod_{j=0}^{Q-1} z[n + i + j \cdot (N + M + P)],$$

where M+P is the length of a periodic extension, Q is the number of frames being processed, and M is the length of communication channel impulse response. The step of forming a window sequence, w[n] is formed in accordance with the relation:

$$w[n] = \sum_{i=0}^{\hat{P}-1} \prod_{j=0}^{Q-1} z[n+i+j \cdot (N+M+P)],$$

where $0 < \hat{P} \leq P$.

A second alternative method includes the steps of forming a sample sequence from a received multicarrier signal, calculating a difference sequence from the sample sequence, forming a window sequence from selected points within the difference sequence, forming a summation sequence by summing selected points within the summation sequence, locating the minimum value of the window sequence, and loading a pointer register based on the sequence index corresponding to the minimum value. The sample sequence is y[n], and the step of forming the difference sequence is performed in accordance with the relationship: $z[n]=|y[n]-y[n+N]|$, where N is number of symbol samples.

The step of forming a window sequence, p[j], is performed in accordance with the If relationship:

$$p[j] = \sum_{i=0}^{\hat{P}-1} z[n+i+j \cdot (N+M+P)],$$

where M+P is the length of a periodic extension, and M is the length of the communication channel impulse response and P is a window of nearly identical samples. The step of forming a summation sequence, w[n] is formed in accordance with the relation:

$$w[n] = \sum_{j=0}^{Q-1} \sum_{i=0}^{\hat{P}-1} z[n+i+j \cdot (N+M+P)],$$

where $0 < \hat{P} \leq P$.

A third alternative method includes the steps of forming a sample sequence from a received multicarrier signal, calculating a difference sequence from the sample sequence, forming a window sequence by weighting and summing selected points within the difference sequence, locating the minimum value of the window sequence, and loading a pointer register based on the sequence index corresponding to the minimum value. The sample sequence is y[n], and the step of forming the difference sequence is performed in accordance with the relationship: $z[n]=|y[n]-y[n+N]|$, where N is number of symbol samples. The window sequence is performed in accordance with the relationship:

$$w[n-R+1] = \sum_{k=0}^{R-1} h_{MF}[n-k]z[k],$$

where $h_{MF}$ is a matched filter of the channel response and R is the matched filter length.

A fourth alternative method includes the steps of forming a sample sequence from a received multicarrier signal, calculating a difference sequence from the sample sequence, forming a window sequence by weighting and summing selected points within the difference sequence, locating the maximum value of the window sequence, and loading a pointer register based on the sequence index corresponding to the maximum value. The sample sequence is y[n], and the step of forming the difference sequence is performed in accordance with the relationship: $z[n]=z_{max}-|y[n]-y[n+N]|$, where N is number of symbol samples and $z_{max} \geq \max\{|y[n]-y[n+N]|\}$. The window sequence is performed in accordance with the relationship:

$$w[n-R+1] = \sum_{k=0}^{R-1} h_{MF}[n-k]z[k],$$

where $h_{MF}$ is a matched filter of the channel response and R is the matched filter length.

A fifth alternative method includes the steps of forming a sample sequence from a received multicarrier signal, calculating a difference sequence from the sample sequence, comparing the difference sequence to a value given by $\epsilon$ for selected points within the difference sequence, and loading a pointer register based on the minimum sequence index corresponding to the minimum value of $\epsilon$. The sample sequence is y[n], and the step of forming the difference sequence is performed in accordance with the relationship: $\forall m \in [0, \hat{P}-1]$, $|y[n+m]-y[n+m+N]| \leq \epsilon$, where N is number of symbol samples, and $\epsilon$ is the minimum value.

Similarly, a sixth alternative method includes the steps of forming a sample sequence from a received multicarrier signal, calculating a difference sequence from the sample sequence, comparing the difference sequence to a value given by $\epsilon$ for selected points within the difference sequence, and loading a pointer register based on the minimum sequence index corresponding to the maximum $\epsilon$. The sample sequence is y[n], and the step of forming the difference sequence is performed in accordance with the relationship: $\forall m \in [0, \hat{P}-1]$, $[z_{max}-|y[n+m]-y[n+m+N]|] \geq \epsilon$, where N is number of symbol samples, $z_{max} \geq \max\{|y[n]-y[n+N]|\}$, and $\epsilon$ is the maximum value.

A seventh alternative method includes the steps of forming a sample sequence from a received multicarrier signal, calculating a difference sequence from the sample sequence, locating the minimum value of the sequence, and loading a pointer register based on the sequence index corresponding to the minimum value. The sample sequence is y[n], and the step of forming the difference sequence is performed in accordance with the relationship:

$$z[n] = \sum_{l=0}^{\hat{P}-1} |y[n+l] - y[n+N+l]|,$$

where N is number of symbol samples.

Regarding other aspect of the invention, a digital filter is connected to the converter, and is essentially a bank of single-tap filters. One of the converter outputs corresponds to a pilot tone, and thus the digital filter provides a filtered pilot tone. The phase of the pilot is also examined to generate a pilot phase signal, preferably by examining the filter tap corresponding to the pilot. The control circuit accepts the pilot phase signal and responsively updates the pointer register if necessary. Alternatively, the control circuit updates the pointer register by deriving a phase signal directly from the relevant converter bin.

The time to frequency domain converter of the timing recovery apparatus is preferably an FFT module, but in a generalized multicarrier transmission system, the converter may apply another type of transformation such as a wavelet transform, or the like. The outputs are generally referred to as bins, where each bin corresponds to a center frequency of a subcarrier. The digital filter of the timing recovery apparatus may be implemented using a magnitude filter and a phase filter. Each of the filters are preferably a single tap filter for each subcarrier or bin. The filter taps are updated using an adaptive updating algorithm, such as a stochastic gradient algorithm, or LMS algorithm. The LMS algorithm may be first or second-order LMS.

Alternatively, the control circuit of the timing recovery apparatus processes the pilot signal directly to derive the phase information, and responsively updates the pointer register. The control circuit also provides inputs to the digital filter, which takes the form of a rotator. That is, a bank of single-tap filters that rotate the inputs. The taps are complex valued of unit magnitude, and thus have an associated phase rotation value. The control circuit updates the single-tap filters using an adaptive updating algorithm, as specified above.

The pointer register is ultimately used for timing offset compensation as disclosed herein and includes the steps of sampling a received multitone signal, converting the sampled signal to complex-valued symbols, determining the phase of an embedded pilot symbol, adjusting the phase of the complex-valued symbols in response to the determined pilot phase, and adjusting a sample pointer in response to the determined pilot phase. The step of adjusting the phase of the complex-valued symbols is preferably performed by a phase equalizer, and the step of determining the phase of an embedded pilot symbol preferably includes examining one or more filter taps within the phase equalizer. The phase equalizer is preferably an adaptive filter that utilizes the well-known adaptation techniques specified above. The step of adjusting the phase of the complex-valued symbols includes rotating the complex-valued symbols using a complex-valued, unit-magnitude, single-tap filter.

The embedded pilot symbol has an associated bin number. The step of adjusting the sample pointer includes the step of examining the pilot bin number, the total number of bins, and the pilot phase. One such method would include the steps of determining an accumulated change in the pilot phase, and comparing the accumulated change to 360 degrees times the pilot bin divided by the total number of bins. In this-manner, the receiver may determine whether the sampling offset exceeds a threshold, that is, whether the sample timing has advanced or retarded by a full sample.

BRIEF DESCRIPTION OF THE DRAWINGS

The objects, features and advantages of the present invention will be more readily appreciated upon reference to the following disclosure when considered in conjunction with the accompanying drawings, in which:

FIGS. 8, 9A, 9B, 10, and 11 show sample signal values for a correlator used in the timing recovery circuit;

DETAILED DESCRIPTION OF THE PREFERRED EMBODIMENT

The frequency domain equalizer disclosed herein is intended for use in a receiver in a multicarrier transmission system. In particular, the equalizer apparatus and methods have been implemented in a system compatible with ADSL transmission protocols, as set forth in, ANSI specification T1.413. The apparatus and methods are also well suited for other multicarrier, discrete multi-tone, or orthogonal frequency division modulation (OFDM) systems.

Figure 1:
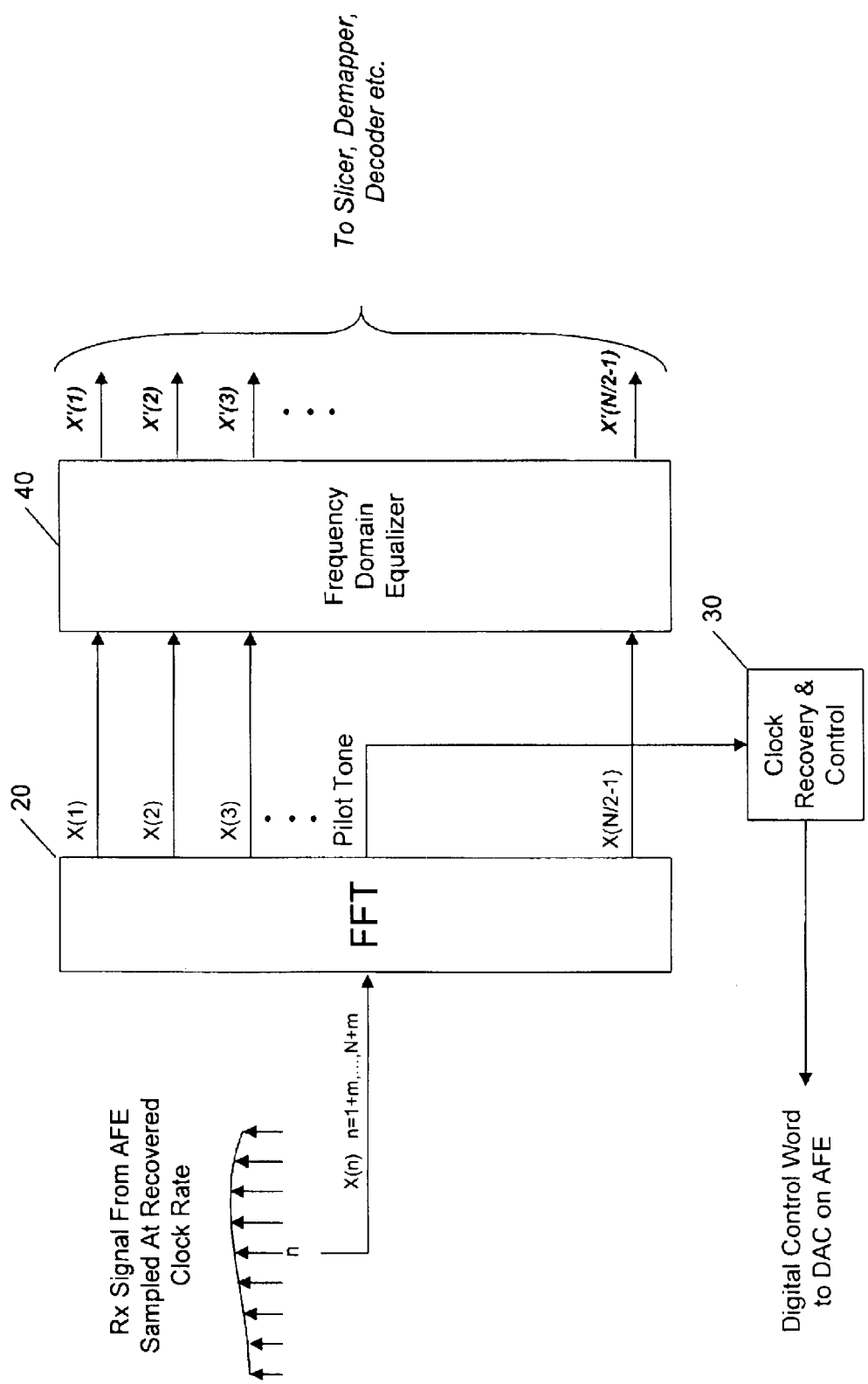
FIG. 1 depicts a prior art frequency domain equalizer.
Figure 2:
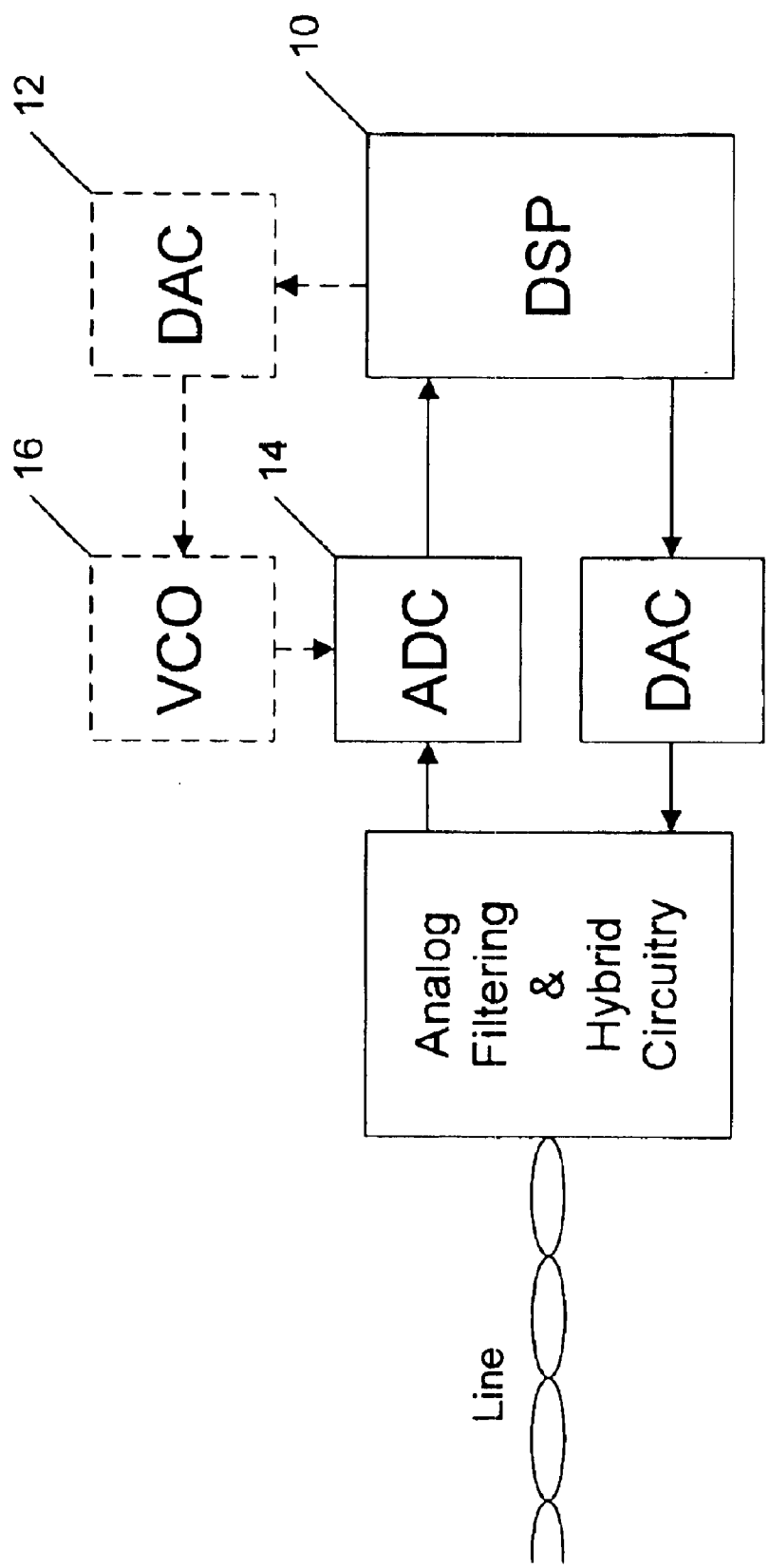
FIG. 2 shows a prior art hardware timing recovery apparatus.
Figure 3:
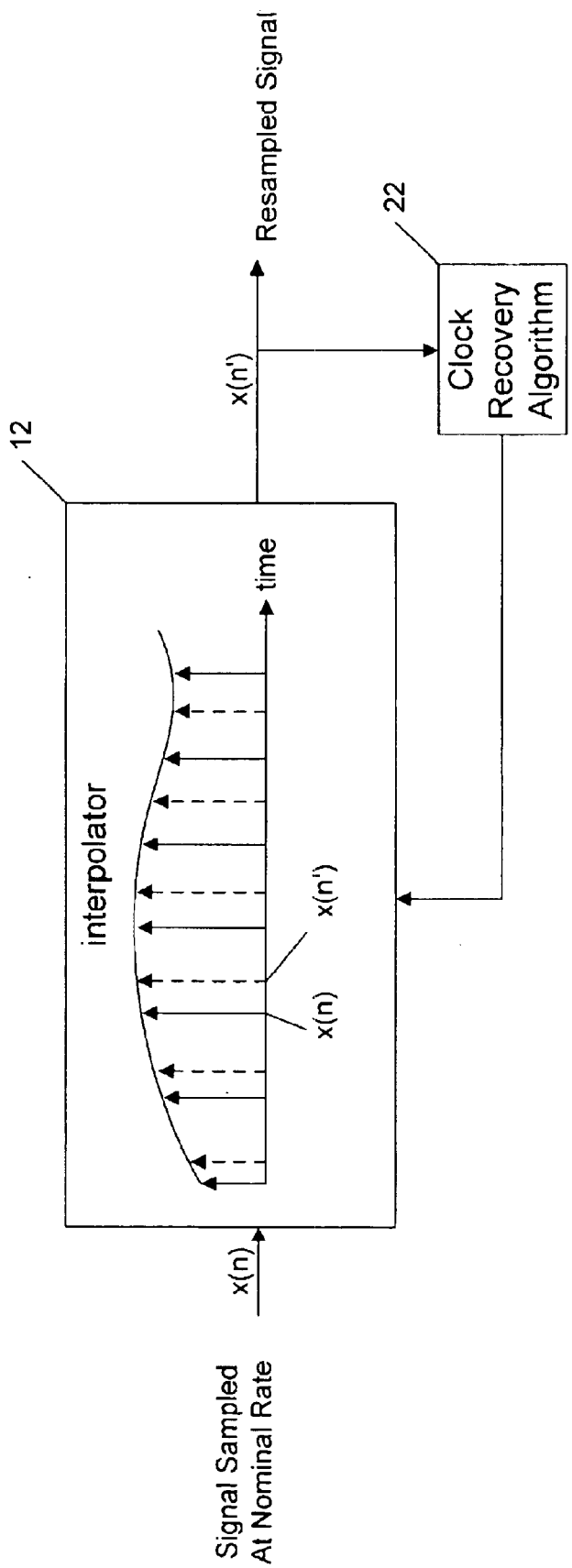
FIG. 3 shows a prior art interpolation filter.
Figure 4:
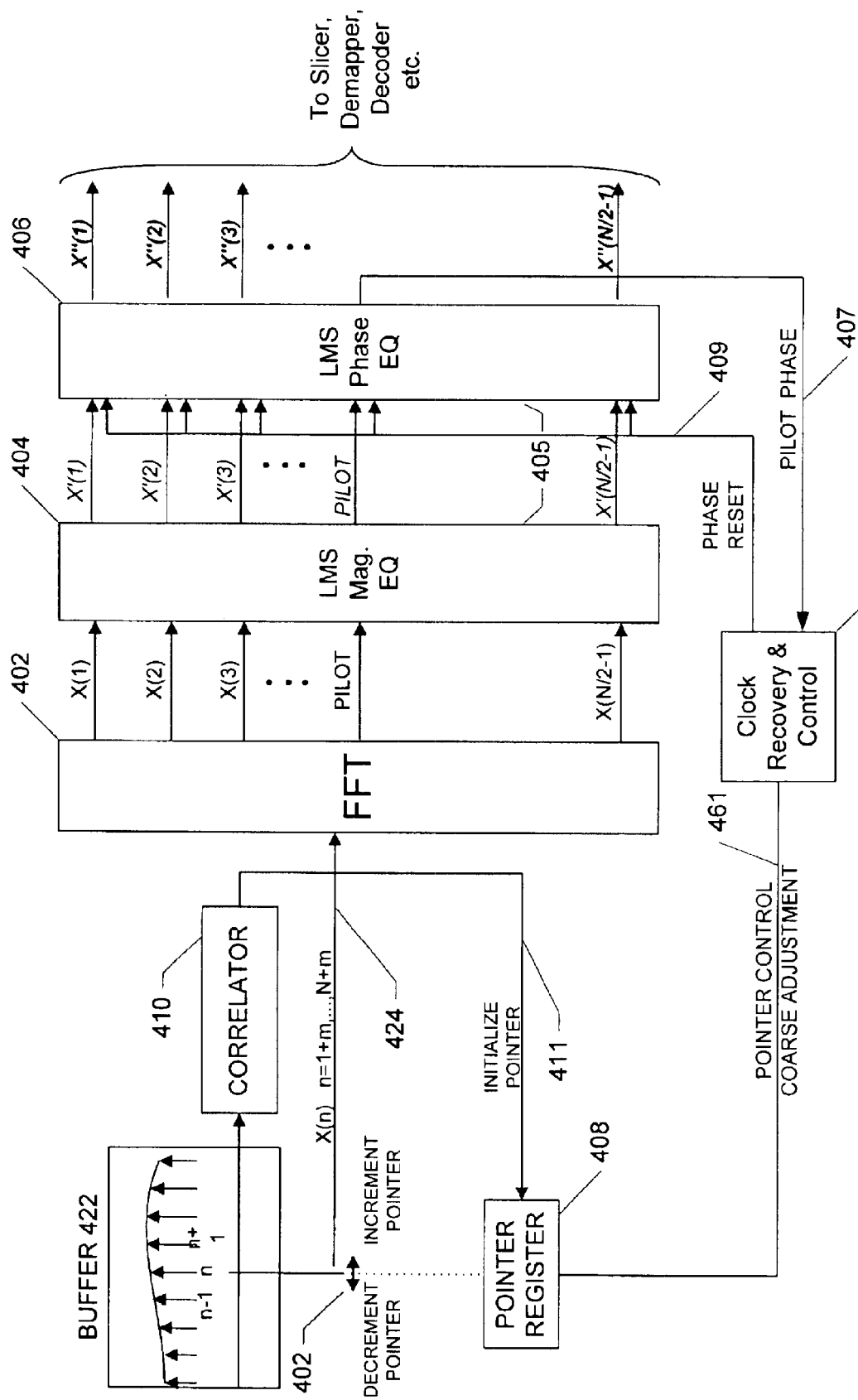
FIG. 4 shows a block diagram of a preferred embodiment of the timing recovery apparatus.

FIG. 4 shows a block diagram of a preferred embodiment of a multitone receiver that includes the timing recovery apparatus and method. Data is received in buffer 422 and provided to correlator 410 and to time domain to frequency domain coverter 402. Preferably, the converter 402 is an FFT module implemented on a microprocessor, or digital signal processor (DSP). The converter provides outputs that represent data symbols in the frequency domain. Each output is referred to as a bin, where each bin contains the magnitude and phase of the corresponding subcarrier. The converter 402 is connected to filter 405.

Filter 405 is preferably implemented as two cascaded filters, magnitude filter 404 and phase filter 406. The filters 404 and 406 are preferably LMS adaptive filters that consist of a single filter tap for each bin. Magnitude filter 404 attempts to correct for magnitude distortion of the received symbols. The magnitude filter is provided with information regarding the decoding of the symbol, such as from a data decision device or slicer. The magnitude filter uses this information to calculate an error signal, which is then used in the adaptive update, as is well-known in the art. The magnitude filter 404 preferably does not affect the phase of the symbol being processed. Phase correction is performed separately by phase filter 406.

Phase filter 406 corrects for phase distortion associated with sampling frequency offsets. Like magnitude filter 404, phase filter 406 performs an adaptive filtering using an LMS filter algorithm. Timing offsets of a constant nature between the transmitter and receiver (when the frequencies are identical, but the phases are offset) will manifest itself as a rotational offset of the signal constellation set at the receiver. Each bin will be rotated by a different amount, and the rotations will exhibit a linear progression from bin to bin. The amount of rotation in each bin will be constant from frame to frame.

When a frequency offset is present, however, the sampling offset (that is, the difference between the optimal sampling instant and the actual sampling instant) will vary across a single data frame. Further, as sampling continues from one frame to the next, the offset worsens. Ultimately, the receiver will slip a sample, or provide an extra one, depending on whether the receiver sampling frequency is slower or faster, respectively, than the transmitter's sample clock reference.

The amount of variation of the sampling instant offset within a single symbol frame depends on the magnitude of the frequency offset. It should be noted that the variation within a single frame will result in inter-carrier interference, but the interference is acceptable if the magnitude of the frequency offset relative to the duration of the symbol frame is not excessive. For a given frequency offset, a shorter symbol frame, having fewer frequency bins, will perform better than a longer one. The method and apparatus described herein treat the sample offset due to a frequency offset as a constant value for a given symbol frame. Additionally, the sample offset increases linearly from frame to frame, resulting in a linear phase rotation in a given bin from frame to frame.

The phase filter 406 corrects for the increasing offset within each bin by updating its coefficients from symbol to symbol. Preferably, the phase filter 406 implements a second order adaptive LMS algorithm to anticipate the increasing phase offset. Each bin will exhibit an increasing phase offset between successive symbol frames, thus the amount of phase correction will increase from symbol to symbol. A second order adaptive filter provides improved tracking in this situation.

The timing recovery apparatus detects when a full sample duration has been slipped (or gained). Preferably, this is done by examining the phase correction filter tap corresponding to the pilot carrier. This information is sent to clock recovery and control circuit 460 on line 407. The control circuit 460 bases the determination on the number of samples per cycle of the pilot carrier frequency, or bin number. For example, if the pilot frequency corresponds to bin number N/4 (where N is the number of samples in a symbol, and the length of the FFT transform), the receiver will take four samples during each cycle of the pilot carrier. The phase associated with each sample is therefore 90°. It follows that a 90° rotation of the pilot carrier at the output of converter 402, bin N/4, will indicate a sampling offset of a full sample. Because the phase filter 406 has been adaptively tracking and correcting for the phase rotation, the phase of the filter tap will be 90° plus the phase correction factor that is present to remove the channel phase distortion. By providing the filter tap value to the clock recovery and control circuit 460 can determine when a full sample offset has occurred, and responsively increment or decrement the pointer value in pointer register 408. Recall that the data sent to the FFT converter 402 is dependent on the value of the pointer.

When the control circuit 460 adjusts the pointer value, the phase of the carrier bin, as well as all other bins, will be corrected. To accommodate this correction provided by the pointer register, the control circuit 460 must reset, or snap back, the filter taps within the phase filter 406. These taps are all reset by adding (or subtracting) the phase rotation for the particular bin due to the sampling instant offset. The taps are therefore reset to their initial phase values, which correspond to the channel equalization values.

In an alternative embodiment, the control circuit can perform a pointer value adjustment at the mid-point of the sampling intervals. In the example above, this would be performed by incrementing or decrementing the pointer register upon detecting a filter tap phase correction value of 45° (or −45°), and resetting the pilot phase filter tap to −45° (or 45°, respectively). The remaining phase filter taps are reset using values appropriate for the particular bin number. For example, the phase reset value for bin N/16 is ±22.5° since each sample corresponds to 22.5° in bin N/16.

In a still further embodiment, the received data signal may be oversampled. That is, the sampling rate used may be higher than the Nyquist rate, which is twice the frequency of the highest frequency signal component. The oversampling may be achieved via hardware—actually sampling the analog signal at a higher rate, or by interpolation. A simplified interpolation scheme such as linear interpolation may be used if the resulting performance is adequate. If, however, sufficient processing capacity is available, higher order polynomial interpolation is preferred. The converter still operates on the same number of data samples, selecting every other data sample in the case of twice oversampling. In this embodiment, the number of samples per cycle available for each subcarrier increases. Thus the phase correction values are modified accordingly. That is, for twice-rate oversampling, the phase rotation correction factor that indicates a full sample timing offset is one half the value of a normally sampled signal. In the above N/4 pilot example, a phase offset of 45° would indicate a full sample offset requiring an increment (or decrement) of the pointer register.

Another factor to consider is the magnitude distortion that occurs in the higher frequency bins as a result of the sampling instant offset. Considering the-Nyquist bin, for an illustrative example, a sampling instant offset will cause the received Nyquist-rate subcarrier to be sampled off the peak value. As the sampling instant offset increases, and the phase rotation likewise increases, the magnitude of the symbols on the Nyquist-rate bin continually decreases until a minimum is reached at a one-half sample offset. It can be shown that this magnitude distortion is worst in the higher frequency bins. By using an interpolater as described above, the phase distortion associated with a single sample offset is decreased, thereby reducing the effects of the magnitude distortion.

Figure 5:
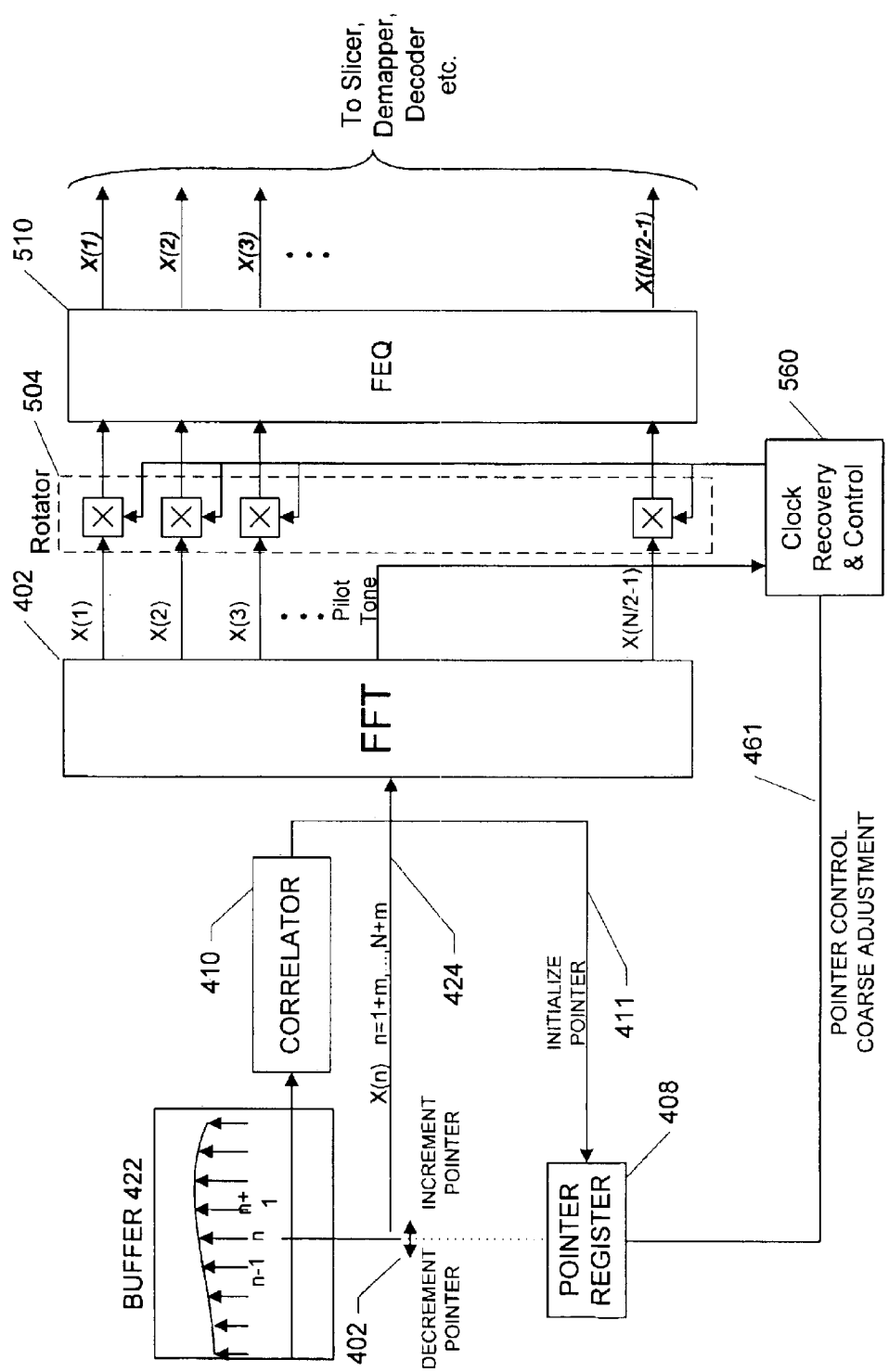
FIG. 5 shows a block diagram of an alternative preferred embodiment of the timing recovery apparatus.

In a second preferred embodiment, shown in FIG. 5, clock recovery and control circuit 560 accepts the pilot tone FFT output and determines the phase offset. The control circuit then calculates the phase corrections for each bin, and supplies them to rotator 504. Rotator 504 includes a multiplicative rotator (essentially a single tap, unit-magnitude filter) for each bin. In an alternative embodiment, control circuit 560 receives input from all the bins, and calculates the phase offset using decision feedback, based on the fact that the phase offset exhibits a linear increase from bin to bin in a given symbol frame. The sum of all the offsets may be formed, and an average offset increment can be calculated and used to form the phase offsets for each bin. Bin one would have a phase correction of one offset increment, bin 2 would have two offset increments, and so on.

The correlator 410 is used to initialize the pointer register 408. In the timing recovery process, the correlator is used to obtain frame synchronization. It performs this task by processing the received samples from A/D converter (not shown). The samples may be received from the buffer 422, or directly from the A/D converter. The correlator locates the beginning of the frame and loads pointer register 408 with the address within the frame buffer 422 that contains the first data sample of the frame. An FFT transformer 402 performs a transform of the real valued time domain signal samples and generates a complex frequency domain signal designated as X(1), X(2), ... X(N/2−1) in FIG. 4. In a first preferred embodiment, equalizer 405 includes a magnitude equalizer 404 and a phase equalizer 406. The equalizer 405 processes blocks of received data and updates the filter coefficients based on error signals, as discussed above.

Figure 6A:
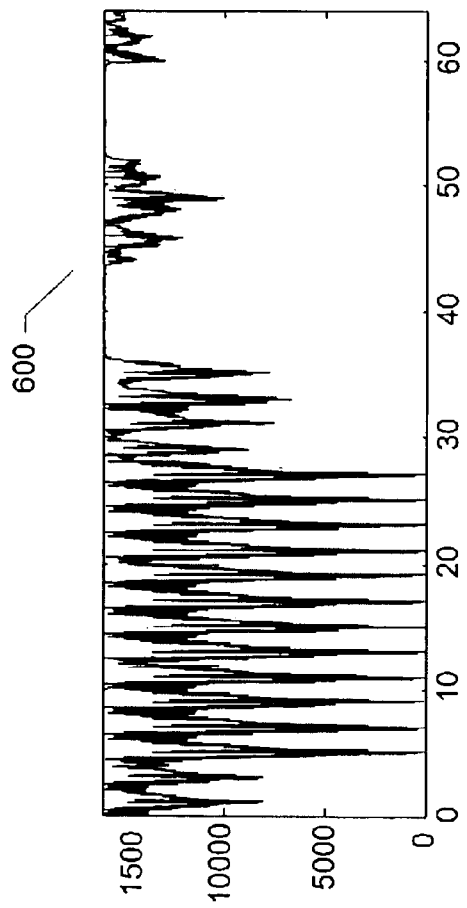
FIGS. 6A and 6B show sample signal values for a correlator used in the timing recovery circuit.

The correlator 410 operates as follows. The received time-domain samples are passed to the correlator 410. The correlator 410 performs a sliding correlation of the samples spaced the length of the time-domain FFT period, which, in the preferred case, is five hundred and twelve samples. The correlator 410 then provides a correlation output 600 as shown in FIG. 6A.

Because the received data is extended in a periodic fashion by the cyclic extension (or prefix), the receiver has a window of samples that are nearly identical to the samples delayed by N, where N is the length of the data, preferably 512 samples. Generally, if the length of the extension is M+P samples long, where M is the length of the channel response, the window of nearly identical samples will be P samples wide. In addition, if there are multiple packets, we know that there will be another window of P samples separated by N+M+P samples in the future that exhibit the same characteristics.

The correlator can locate the beginning of a frame using a number of methods to identify the repetitive characteristics associated with cyclic extension. Recall that portions of the cyclic extensions will be corrupted by previous data frames. This dispersion, if not for the presence of the extension, would result in intersymbol interference. Preferably, the correlator 410 examines a number of symbol frames before deciding on the best estimate of the beginning of the frame.

In one such preferred method, the correlator 410 constructs a sequence $z[n]=z_{max}-|y[n]-y[n+N]|$, where $z_{max}$ is chosen to be at least the maximum value of $|y[n]-y[n+N]|$. This constraint guarantees that $z[n]$ is non-negative for all n. Because $z[n]$ is non-negative, the product of any $z[n]$s is also non-negative. The sequence $z[n]$, a sample of which is shown in FIG. 6A, provides an initial estimate of the correlation between two data samples, $y[n]$ and $y[n+N]$. If either of these samples are within the cyclic prefix and the other is within the corresponding data symbol, the correlation will be fairly high—that is, the difference will be near zero, and the value of $z[n]$ will be near $z_{max}$. For P of those values, the correlation is particularly strong because the length M channel response will not cause the previous symbol to corrupt P samples of the M+P length extension.

Within a single symbol frame, analysis of the correlation sequence may be facilitated by the application of a filter such as a moving average filter, or other low-pass filter. However, in a preferred method, the correlator 410 examines estimates from a number of symbols. For example, if there are at least Q symbol frames, and each frame is N+M+P samples wide, then the correlator can examine Q windows $\hat{P}$ samples wide where $z[n] \approx z_{max}$. ($\hat{P}$ is used to provide a more general expression, where $0 < \hat{P} \leq P$.) The correlator then calculates a new series $$w[n] = \sum_{i=0}^{\hat{P}-1} \prod_{j=0}^{Q-1} z[n+i+j \cdot (N+M+P)].$$

Figure 6B:
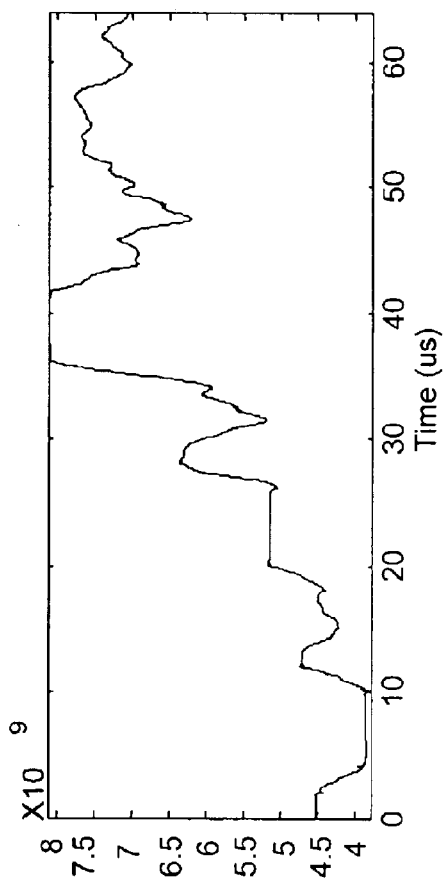

The inner multiplication, represented by:

$$p[i] = \prod_{j=0}^{Q-1} z[n+i+j \cdot (N+M+P)],$$

forms the product of all the $z[n]$s separated by a frame duration. This provides a multiplicative estimate, where each multiplicative estimate indicates whether the corresponding location within each frame has a high correlation across numerous symbol frames (Q of them). Somewhere in the sequence, it is expected that there will be $\hat{P}$ successive values that have a high multiplicative estimate. Thus, the summation over a window size of $\hat{P}$ values provides the final estimate $w[n]$ that is useful in locating the beginning of a symbol. A typical sequence $w[n]$ is shown in FIG. 6B. The maximum value of $w[n]$ is expected to be approximately $\hat{P} \cdot z^Q_{max}$. The correlator 410 thus seeks the maximum $w[n]$, which represents the first point that can be used as the starting point of the frame. The process will typically only generate a single maximum point. This point is $w_{max}[n]=w[n]$. Any point from n' to $n'+\hat{P}-1$ can be used as the starting point, under the assumption that there are at least P samples where there is a valid starting point.

Similarly, an alternative method is to construct a sequence such that $z[n]=|y[n]-y[n+N]|$. If there are at least Q frames, and each frame is N+M+P samples wide, then there will be Q windows that are $\hat{P}$ samples wide (where $0<\hat{P}\leq P$) where $z[n] \approx 0$. The correlator 410 then calculates a summation sequence $$w[n] = \sum_{j=0}^{Q-1} \prod_{i=0}^{\hat{P}-1} z[n+i+j(N+M+P)].$$

Figure 8:
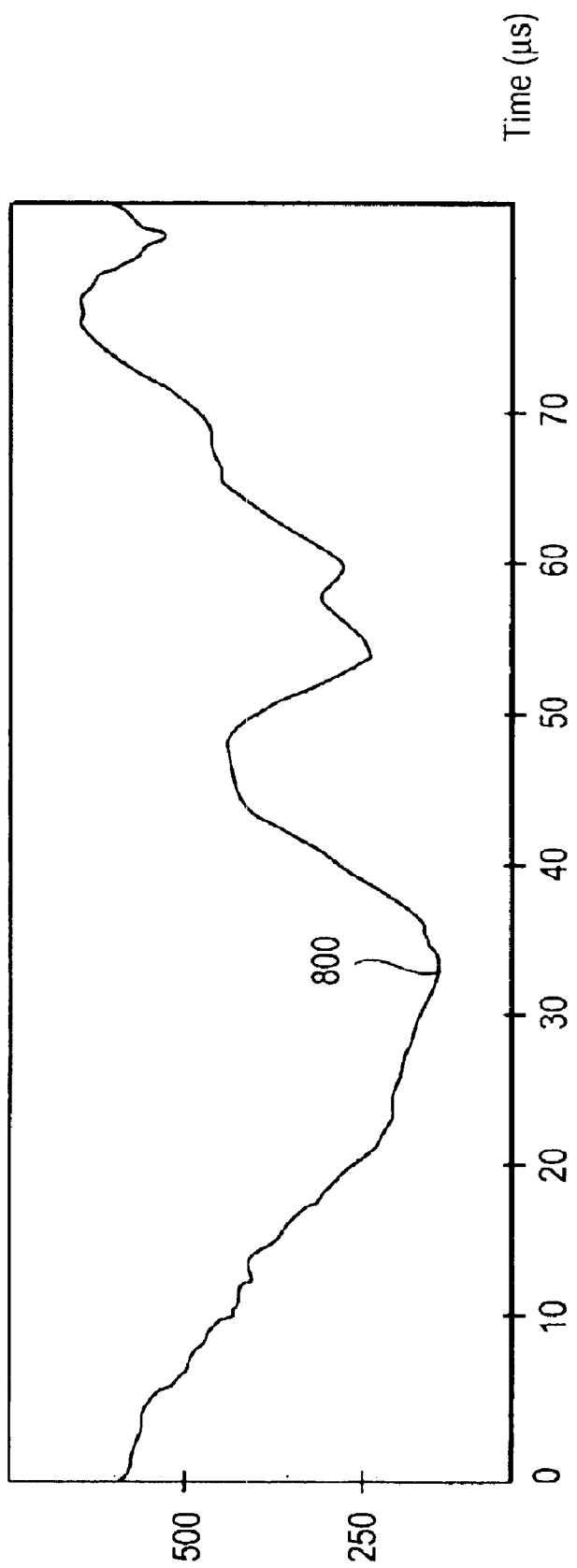

The inner summation, represented by:

$$p[j] = \prod_{i=0}^{\hat{P}-1} z[n+i+j(N+M+P)],$$

forms a summation of $\hat{P}$ successive values within the corresponding frame. This provides a window sequence, where each point indicates whether a window $\hat{P}$ samples wide in the corresponding frame has a high correlation. The summation over the all of the windows given by Q provides the final estimate $w[n]$ that is useful in locating the beginning of a frame. A typical sequence $w[n]$ with a minimum 800, is shown in FIG. 8. The correlator 410 thus seeks the minimum $w[n]$, which represents the first point that can be used as the starting point of the frame. Any point from n to $n+\hat{P}-1$ can be used as a starting point.

An embodiment to the previous method uses the sequence $z[n]$, and replaces the summation with a matched filter to get the series $w[n]$. If the channel response can be predicted then a matched filter can be chosen. For the matched filter case, with a matched filter $h_{MF}$ having a length of R, the correlator will create a window sequence $$w[n-R+1] = \sum_{k=0}^{R-1} h_{MF}[n-k]z[k].$$

The term R-1 offsets the sequence $w[n-R+1]$, so that minimizing $w[n-R+1]$ with respect to n will give us a real offset from the beginning of the sequence $y[n]$. This sequence forms a window weighted by the matched filter. The correlator 410 thus seeks the minimum $w[n]$, which represents the first point that can be used as the starting point of the frame. Any point from n to $n+\hat{P}-1$ can be used as a starting point.

By replacing the sequence $z[n]$ in the previous method from the sequence $z[n]=|y[n]-y[n+N]|$ to $z[n]=z_{max}-|y[n]-y[n+N]|$, where $z_{max}$ is chosen to be a least the maximum value of $|y[n]-y[n+N]|$, the beginning of the window of highly correlated samples occurs at the maximum of $w[n]$.

Given that the data is extended in periodic fashion, it is known that a window of P samples is nearly identical. If the original signal $x[n]$ before transmission is periodic with period N, the $x[n]=x[n+N]$. Once past the first M samples of the channel response, then $y[n] \approx y[n+N]$, where the sample $y[n]$ is highly correlated to $y[n+N]$. More specifically, for a window of P samples $|y[n]-y[n+N]| \approx 0$, such a window 900 is shown in FIG. 9A.

In one such preferred method, the correlator 410 locates a window that is $\hat{P}$ samples wide where $|y[n]-y[n+N]|$ is very close to zero, that is the correlation is high between the two samples $y[n]$ and $y[n+N]$. To find this window, all of the samples in a window $\hat{P}$ samples wide must be less than or equal to a small value,$\epsilon$. More specifically, by finding the smallest n and $\epsilon$ that satisfies $\forall m \in [0,\hat{P}-1]$, $|y[n+m]-y[n+m+N]| \leq \epsilon$ window 925 of highly correlated samples can be found, as shown in FIG. 9B. Any sample in that window of $\hat{P}$ samples will work as a starting point of a frame.

Figure 10:
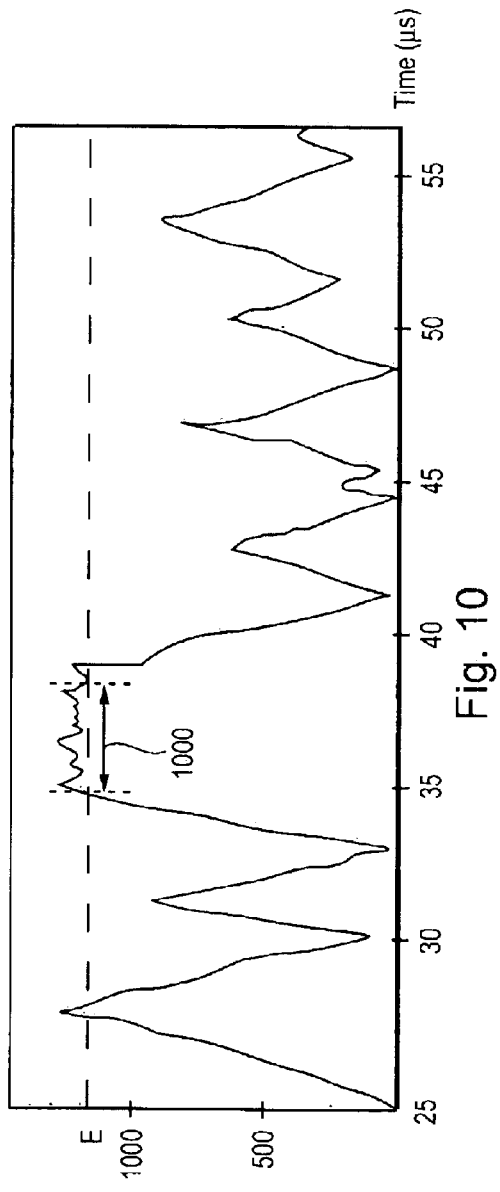

As an alternative method, the correlator 410 constructs a sequence $z[n]=z_{max}-|y[n]-y[n+N]|$, where $z_{max}$ is chosen to be at least the maximum value of $|y[n]-y[n+N]|$. This constraint ensures that $z[n]$ is greater than zero for all n. The smallest n for the largest $\epsilon$ satisfying the relation $\forall m \in [0, \hat{P}-1]$, $[z_{max}-|y[n+m]-y[n+m+N]|] \geq \epsilon$ is the beginning of a window of highly correlated values. Using this relation, FIG. 10 is an example where all of the samples in a window 1000 $\hat{P}$ samples wide must be greater than or equal to $\epsilon$. Any sample in that window of $\hat{P}$ samples will work as a starting point of a frame.

Figure 11:
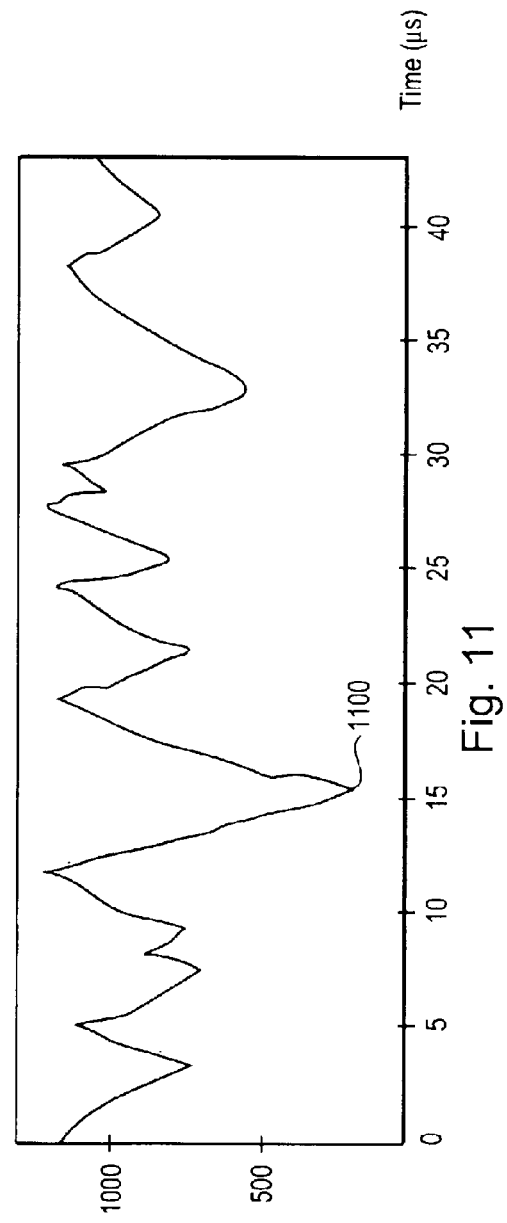

Another preferred method for locating the beginning of data frames using a non-iterative process is to find a window that is $\hat{P}$ samples wide (where $0 < \hat{P} \leq P$) where $|y[n]-y[n+N]|$ is very close to zero. This particular method of finding that window is by using the fact that $|y[n]-y[n+N]|$ is positive. By creating a sequence $$z[n] = \sum_{l=0}^{\hat{P}-1} |y[n+l] - y[n+N+l]|,$$

the correlator 410 will look for then corresponding to the minimum value of $z[n]$, such as shown in FIG. 11. More specifically, the minimum value 1100 of the sequence $z[n]$, represents the start of a window for which all samples in a $\hat{P}$ sample wide window are highly correlated. That is, the window is comprised of samples that are in the cyclic prefix and the others are within the corresponding data symbol. Any sample in that window of $\hat{P}$ samples will work as a starting point.

As with all preferred methods it is true that for subsequent frames in the same packet, the starting point needs only to be calculated once since the number of samples in each frame is known (N+M+P). For more accuracy, however, the starting point can be found for each frame.

Figure 7:
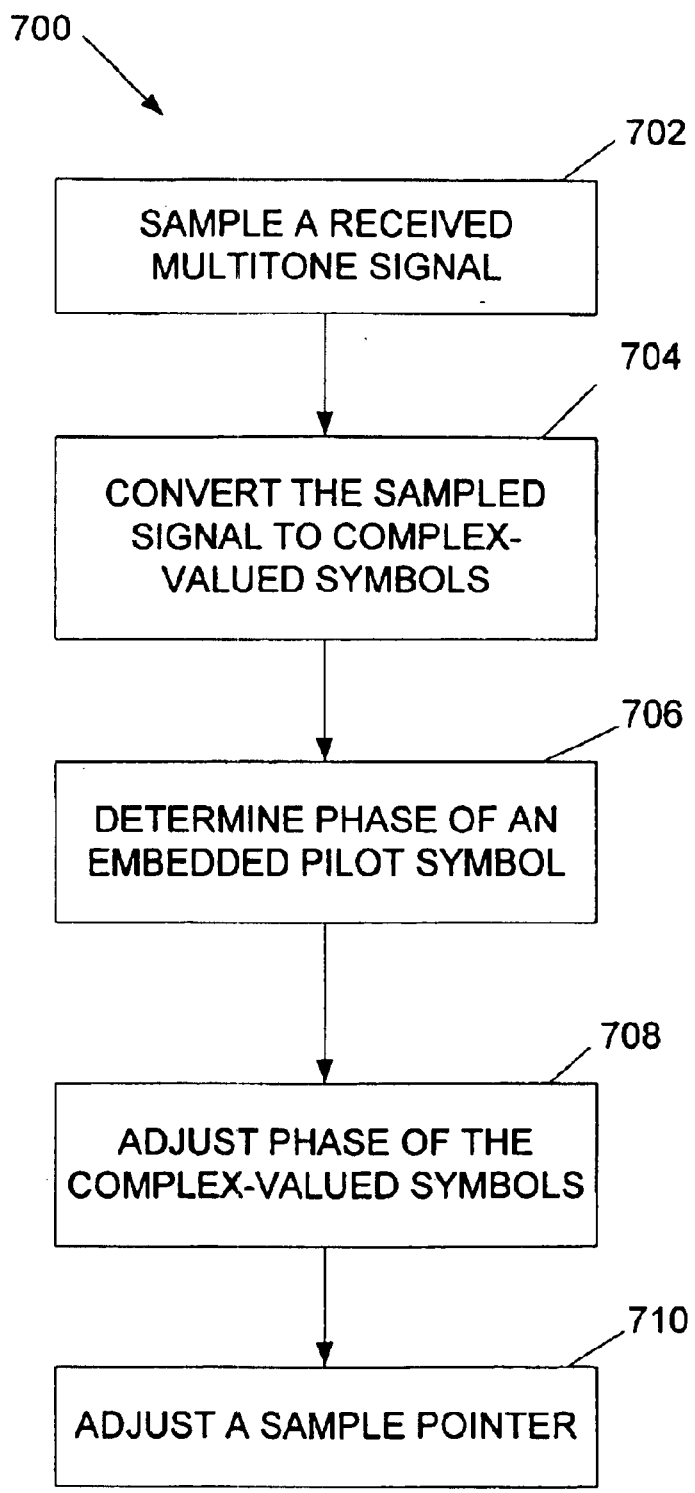
FIG. 7 shows a flowchart of the timing recovery methods disclosed herein.

FIG. 7 is a flow diagram illustrating a Method 700 of frequency offset compensation in a multitone-modulation receiver. The Method 700 includes sampling a received multitone signal at Step 702. At Step 704, the sampled multitone signal is converted to complex-valued symbols. Preferably this is performed by an FFT module. The phase of an embedded pilot symbol is determined at Step 706. The use of filter taps may facilitate the determination of this phase. For example, examining filter taps within the phase equalizer may provide sufficient information to determine the phase of the embedded signal. Specifically, the phase value of the filter tap provides an indication of the phase offset of the pilot. Additionally, the phase equalizer may be in the form of an adaptive filter, although the present invention is not limited to this embodiment and other forms of phase equalizer may be used.

At Step 708, the phases of the complex-valued symbols are adjusted in response the phase of the pilot symbol that was embedded in the multitone signal. For example, a phase equalizer may perform this phase adjustment. As above, the phase equalizer may be in the form of an adaptive filter. Alternately, the phase adjustment may include rotating the complex-valued symbols using a single-tap filter. The filter may have a unit magnitude and be complex-valued. At Step 710, a sample pointer is adjusted in response to the determined pilot phase.

The embedded pilot symbol typically has an associated bin number. The Step 710 of Method 700 includes examining information on the bins. The information that may be examined includes the pilot bin number, the total number of bins, and the pilot phase.

A preferred embodiment of the present invention has been described herein. It is to be understood, of course, that changes and modifications may be made in the embodiment without departing from the true scope of the present invention, as defined by the appended claims. The present embodiment preferably includes logic to implement the described methods in software modules as a set of computer executable software instructions. The Computer Processing Unit ("CPU") or microprocessor implements the logic that controls the operation of the transceiver. The microprocessor executes software that can be programmed by those of skill in the art to provide the described functionality.

The software can be represented as a sequence of binary bits maintained on a computer readable medium including magnetic disks, optical disks, and any other volatile or (e.g., Random Access memory ("RAM")) non-volatile firmware (e.g., Read Only Memory ("ROM")) storage system readable by the CPU. The memory locations where data bits are maintained also include physical locations that have particular electrical, magnetic, optical, or organic properties corresponding to the stored data bits. The software instructions are executed as data bits by the CPU with a memory system causing a transformation of the electrical signal representation, and the maintenance of data bits at memory locations in the memory system to thereby reconfigure or otherwise alter the unit's operation. The executable software code may implement, for example, the methods as described above.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

It should be understood that a hardware embodiment may take a variety of different forms. The hardware may be implemented as an integrated circuit with custom gate arrays or an application specific integrated circuit ("ASIC"). Of the course, the embodiment may also be implemented with discrete hardware components and circuitry. In particular, it is understood that the filter structures described herein may be implemented in dedicated hardware such as an ASIC, or as program instructions carried out by a microprocessor.

The claims should not be read as limited to the described order of elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A method of determining a symbol frame boundary in a multicarrier data signal, comprising the steps of:

forming a sample sequence from a received multicarrier signal;

calculating a difference sequence from the sample sequence, wherein the sample sequence is y[n], and the step of forming the difference sequence, z[n], is performed in accordance with the relationship: z[n]=|y[n]−y[n+N]|, wherein N, an integer, is the number of samples in a symbol, and n is an integer index;

forming a window sequence from selected points within the difference sequence;

forming a summation sequence by summing selected points within the summation sequence;

locating the minimum value of the window sequence; and loading a pointer register based on a sequence index corresponding to a maximum value.

2. The method of claim 1, wherein the step of forming a window sequence, p[j,n], is performed in accordance with the relationship:

$$p[j, n] = \sum_{i=0}^{\hat{P}-1} z[n + i + j \cdot (N + M + P)],$$

where M+P is the length of a periodic extension, M is the length of a communication channel impulse response, i is an integer index, j is an integer index, P is an integer representing the difference between M and the length of the periodic extension, and $\hat{P}$ is an integer where $0<\hat{P}\leq P$.

3. The method of claim 2 wherein the step of forming a summation sequence, w[n] is formed in accordance with the relation:

$$w[n] = \sum_{j=0}^{Q-1} \sum_{i=0}^{\hat{P}-1} z[n + i + j \cdot (N + M + P)], \text{ where } 0 < \hat{P} \leq P,$$

and Q is a number of frames being processed.

4. A method of determining a symbol frame boundary in a multicarrier data signal, comprising the steps of:

forming a sample sequence from a received multicarrier signal;

calculating a difference sequence from the sample sequence, wherein the sample sequence is y[n], and the step of forming the difference sequence, z[n], is performed in accordance with the relationship: z[n]=|y[n]−y[n+N]|, where N, an integer, is the number of samples in a symbol, and n is an integer index;

forming a window sequence by weighting and summing selected points within the difference sequence;

locating the minimum value of the window sequence; and loading a pointer register based on a sequence index corresponding to the minimum value.

5. The method of claim 4 wherein the step of forming a window sequence, w[n] is formed in accordance with the relation:

$$w[n - R + 1] = \sum_{k=0}^{R-1} h_{MF}[n - k]z[k],$$

wherein R is an integer offset, $h_{MF}$ is a matched filter, and k is an integer index.

6. A method of determining a symbol frame boundary in a multicarrier data signal, comprising the steps of:

forming a sample sequence from a received multicarrier signal;

calculating a difference sequence from the sample sequence, wherein the sample sequence is y[n], and the step of forming the difference sequence, z[n], is performed in accordance with the relationship: z[n]=$z_{max}$−|y[n]−y[n+N]|, where $z_{max}$ is the maximum value of |y[n]−y[n+N]|, N, an integer, is the number of samples in a symbol, and n is an integer index;

forming a window sequence by weighting and summing selected points within the difference sequence;

locating the maximum value of the window sequence; and loading a pointer register based on a sequence index corresponding to the maximum value.

7. The method of claim 6 wherein the step of forming a window sequence, w[n] is formed in accordance with the relation:

$$w[n - R + 1] = \sum_{k=0}^{R-1} h_{MF}[n - k]z[k],$$

where R is an integer offset, $h_{MF}$ is a matched filter, and k in an integer index.

8. A method of determining a symbol frame boundary in a multicarrier data signal, comprising the steps of:

forming a sample sequence from a received multicarrier signal;

calculating a difference sequence for a window of values from the sample sequence, wherein the sample sequence is y[n], and the step of forming the difference sequence and comparing to a minimum value is performed in accordance with the relationship: $\forall m \in [0, \hat{P}-1], |y[n+m]-y[n+m+N]| \leq \epsilon$, where N, an integer, is the number of samples in a symbol, $\epsilon$ is the minimum value to which the sequence is compared, $\hat{P}$, is an integer, where $0<\hat{P}\leq P$, and P is an integer number of samples that is a measure by which a periodic extension exceeds a channel impulse response;

comparing the difference sequence to a minimum value; and loading a pointer register based on a minimum sequence index corresponding to the minimum value.

9. A method of determining a symbol frame boundary in a multicarrier data signal, comprising the steps of:

forming a sample sequence from a received multicarrier signal;

calculating a difference sequence for a window of values from the sample sequence, wherein the sample sequence is y[n], and the step of forming the difference sequence and comparing to a maximum value is performed in accordance with the relationship: $\forall m \in [0, \hat{P}-1], [z_{max}-|y[n+m]-y[n+m+N]|] \leq \epsilon$, where N, an integer, is the number of symbol samples, n is an integer index, m is an integer index, $\epsilon$ is the maximum value to which the sequence is compared, $\hat{P}$, is an integer, where $0<\hat{P}\leq P$, and P is an integer number of samples that is a measure by which a periodic extension exceeds a channel impulse response;

comparing the difference sequence to a value; and loading a pointer resister based on a minimum sequence index corresponding to a maximum value.

10. A method of determining a symbol frame boundary in a multicarrier data signal, comprising the steps of:

forming a sample sequence from a received multicarrier signal;

calculating a difference sequence from the sample sequence, wherein the sample sequence is y[n], and the step of forming the difference sequence, z[n], is performed in accordance with the relationship:

$$z[n] = \sum_{l=0}^{\hat{P}-1} |y[n+l] - y[n+N+l]|,$$

where N, an integer, is the number of samples in a symbol, l is an integer index, n is an integer index, $\hat{P}$, is an integer, where $0<\hat{P}\leq P$, and P is an integer number of samples that is a measure by which a periodic extension exceeds a channel impulse response;

forming a window sequence by weighting and summing selected points within the difference sequence;

locating the maximum value of the window sequence; and locating a pointer register based on a sequence index corresponding to the maximum value.

11. A method of determining a symbol frame boundary in a multicarrier data signal, comprising the steps of:

forming a sample sequence from a received multicarrier signal;

calculating a difference sequence, z[n], from the sample sequence, wherein the sample sequence is y[n], and the step of calculating the difference sequence is performed in accordance with the relationship: $z[n]=z_{max}-|y[n]-y[n+N]|$, where $z_{max}$ is the maximum value of $|y[n]-y[n+N]|$, N, an integer, is the number of samples in a frame, and n is an integer index;

forming a multiplicative estimate sequence from selected points within the difference sequence;

forming a window sequence by summing selected points within the product sequence;

locating the maximum value of the window sequence; and loading a pointer register based on the sequence index corresponding to the maximum value.

12. The method of claim 11, wherein the step of forming a multiplicative estimate sequence, p[i,n], is performed in accordance with the relationship:

$$p[i, n] = \prod_{j=0}^{Q-1} z[n + i + j \cdot (N + M + P)],$$

wherein Q is the number of frames being processed, M+P is the length of a periodic extension, M is the length of a communication channel impulse response, P is an integer number of samples that is a measure by which the periodic extension exceeds the channel impulse response, i is an integer index, and j is an integer index.

13. The method of claim 12, wherein the step of forming a window sequence, w[n] is performed in accordance with the relationship:

$$w[n] = \sum_{i=0}^{\hat{P}-1} \prod_{j=0}^{Q-1} z[n + i + j \cdot (N + M + P)],$$

where $\hat{P}$ is an integer and $0<\hat{P}\leq P$.

* * * * *